United States Patent [19]
Gould

[11] 3,821,424
[45] June 28, 1974

[54] PRESERVATION OF PACKAGED FOODSTUFF

[75] Inventor: Grahame Warwick Gould, Bedford, England

[73] Assignee: Lever Brother Company, New York, N.Y.

[22] Filed: June 23, 1972

[21] Appl. No.: 265,937

[52] U.S. Cl.............. 426/106, 426/129, 426/151, 426/224, 426/331
[51] Int. Cl....... A23b 1/00, A23l 3/00, B65b 55/00
[58] Field of Search............ 99/107, 108, 150, 157, 99/174; 426/106, 129, 151, 224, 331, 167, 168

[56] References Cited
UNITED STATES PATENTS 3,560,222   2/1971   Delaney................................. 99/108
3,692,534   9/1972   Veno et al. .......................... 99/150

*Primary Examiner*—Hyman Lord
*Attorney, Agent, or Firm*—John J. Maitner

[57] ABSTRACT

A package contains a moist-foodstuff which would normally be subject to microbial spoilage but which has an alkaline pH to preserve it during storage. Mixed with this foodstuff is an alkali-neutralising substance which is not available to act upon the foodstuff during storage at ambient temperature but which is releasable to neutralise to foodstuff when the content of this package are heated prior to consumption.

3 Claims, No Drawings

PRESERVATION OF PACKAGED FOODSTUFF

The invention relates to the preservation of moist perishable foodstuffs.

It is possible to preserve moist perishable foodstuffs by acidifying them, freezing them or drying them, or by heat sterilising them in containers of metal or plastics material, or by the addition of chemical preservatives such as sorbic acid, but each of these methods can be either costly to put into effect or deleterious to the product.

We have now discovered that it is possible to preserve moist perishable foodstuffs without resort to heating, freezing or drying by the addition of an edible alkali, the effect of which is neutralised prior to consumption by release of a loosely bound alkali-neutralising agent.

According to the invention, we provide a package containing a moist foodstuff which would normally be subject to microbial spoilage but which has an alkaline pH to effect preservation during storage, and an alkali-neutralising substance which is not available to act upon the foodstuff during storage at ambient temperature but which is releasable to act upon the foodstuff by heating the contents of the package, for example prior to serving for consumption, whereby the effect of the alkali on the foodstuff is reduced or removed.

We have shown that the presence of an alkali such as sodium carbonate or sodium hydroxide will effectively inhibit microbial growth when mixed with a moist perishable foodstuff, thus enabling the foodstuff to be preserved for an extended period of time at ambient temperature, provided that the pH of the foodstuff is at least 10, preferably at least 11.

Evidence in support of the inhibition of bacteria at high pH values is provided in Experiment 1 which is described later in this specification.

We have also discovered that a number of basic substances, for example clupeine and salmine, and sequestrants, for example hexametaphosphate, EDTA, citrate and phytate which are ineffective as inhibitors of microbial growth at low or neutral pH values become increasingly effective as the pH value is raised, and will therefore potentiate the preservative effects of alkalinity. Accordingly, such substances may be included with an alkali in a moist perishable foodstuff to effect preservation at a pH value which is usually lower than that necessary to effect preservation when these substances are not present.

Evidence in support of the inhibition of bacteria by such basic substances and sequestrants when applied in alkaline nutrient environments is provided in Experiments 2 and 3 described later in this specification.

When the alkali-preserved foodstuff is heated prior to consumption, an encapsulated or otherwise bound alkali-neutralising substance is released in order to reduce the pH of the product to the value near that at which it is normally consumed.

Suitable alkali-neutralising substances are edible organic acids such as acetic acid, citric acid and tartaric acid, or mineral acids such as hydrochloric acid, or acidic phosphates.

The alkali-neutralising substance can be bound by providing it with a protective coat to prevent its premature release while the foodstuff is being stored. As an example the alkali-neutralising substance can be encapsulated with an edible film such as gelatin which melts or disintegrates at cooking temperature, or it may be physically bound within particles of a high melting edible fat such as palm top stearin fraction which melts at about 60° C, or other suitable fats which melt to release the alkali-neutralising substance when the foodstuff is heated.

In order that the alkali-neutralising substance should effectively and uniformly reduce the pH when the foodstuff is heated, particles of the encapsulated or otherwise bound substance should be evenly distributed throughout the foodstuff. The invention is, for this reason, particularly applicable to finely divided or comminuted foodstuffs such as sausage meat or vegetable puree, and to liquid foodstuffs such as sauces.

Preferably the foodstuff will be pasteurised in order to inactivate non-spore forms of bacteria, in which case the capsules will be so constructed as to retain their contents at the pasteurisation temperature (e.g. 75° C) and yet release their contents on cooking.

It is particularly surprising to note that, where the perishable moist foodstuff is raw meat, the red colour which is mainly due to the presence of oxymyoglobin, is not destroyed by raising the pH to an alkaline value, whereas red meat which is acidified in order to preserve it suffers permanent loss of this red colour. Furthermore, we have noted that the alkali taint that has hitherto been associated with foods which have been treated with alkali can completely disappear when the pH is reduced on release of the alkali-neutralising substance by heating the foodstuff.

Certain aspects of the invention are illustrated by the following Experiments.

EXPERIMENT 1

This Experiment illustrates the effect of alkaline pH on the growth of typical food spoilage bacteria otherwise cultured under ideal conditions.

Samples of heart infusion agar were adjusted with sodium hydroxide to pH values of 7.2, 8.2, 9.2, 10.0, 10.5 and 10.7, dispensed in filled bottles and inoculated with cultures of various bacteria. The cultures were incubated at 30° C for 30 days and growth of the bacteria was recorded.

The results (Table I) showed that the growth of certain bacteria was retarded at pH 8.2, and the most resistant bacteria were inhibited at pH 10.7.

The bacterial spores were all inhibited by alkali at pH 10.0. Consequently, when a mild (pasteurising) heat treatment is employed to inactivate the vegetative bacteria, the pH values needed to inhibit growth are considerably lower than when no heat treatment is employed.

TABLE I

| Bacteria | No. of Strains Tested | Growth* at pH Values | | | | | |
|---|---|---|---|---|---|---|---|
| | | 7.2 | 8.2 | 9.2 | 10.0 | 10.5 | 10.7 |
| Micrococcus | 8 | ++ | + | + | -- | -- | -- |
| Staphylococcus | 5 | +++ | ++ | ++ | -- | -- | -- |
| Staph. aureus | 7 | +++ | +++ | ++ | -- | -- | -- |
| Bacillus (vegetative) | 3 | +++ | +++ | ++ | -- | -- | -- |

TABLE I — Continued

| Bacteria | No. of Strains Tested | Growth* at pH Values | | | | | |
|---|---|---|---|---|---|---|---|
| | | 7.2 | 8.2 | 9.2 | 10.0 | 10.5 | 10.7 |
| Bacillus (spores) | 4 | +++ | +++ | +++ | – | – | – |
| Clostridium (vegetative) | 12 | +++ | +++ | +++ | + | – | – |
| Clostridium (spores) | 8 | +++ | +++ | +++ | – | – | – |
| Clost. perfringens (vegetative) | 4 | +++ | +++ | +++ | + | – | – |
| Escherichia | 4 | +++ | +++ | +++ | – | – | – |
| Klebsiella | 2 | +++ | +++ | +++ | – | – | – |
| Proteus | 4 | +++ | +++ | +++ | – | – | – |
| Salmonella | 6 | +++ | +++ | +++ | – | – | – |
| Shigella | 4 | +++ | +++ | ++ | – | – | – |
| Chromobacteria | 2 | +++ | +++ | +++ | – | – | – |
| Pseudomonas | 7 | +++ | +++ | ++ | + | – | – |
| Bacteroides | 1 | +++ | +++ | ++ | + | – | – |
| Corynebacterium | 1 | +++ | +++ | ++ | – | – | – |
| Microbacteria | 2 | +++ | +++ | ++ | – | – | – |
| Lactobacillus | 3 | +++ | ++ | – | – | – | – |
| Streptococcus | 5 | +++ | +++ | +++ | +++ | ++ | – |
| Streptococcus | 4 | +++ | +++ | – | – | – | – |
| Strep. faecalis | 2 | +++ | +++ | +++ | +++ | ++ | – |
| Yeasts | 3 | ++ | ++ | – | – | – | – |

\* +++ Good growth
++ Slight inhibition
+ Severe inhibition
– No growth

EXPERIMENT 2

This Experiment illustrates the alkali potentiation of the anti-bacterial substance clupeine sulphate when its effect was tested against typical food spoilage bacteria otherwise cultured under ideal conditions.

Heart infusion broth in 10 ml amounts was adjusted with sodium hydroxide to pH values of 7.0, 7.5, 8.0, 8.5, 9.0, 9.5, 10.0, 10.5, and 11.0. The basic substance clupeine sulphate was added to samples of the media at levels of 0, 0.1, 0.25, 0.5, 1, 2.5, 5. 10, 50, 100, 200, 300, 400, 500, and 600 ppm. Each series was inoculated with cells of various pure cultures of bacteria at a concentration of about $10^5$/ml and incubated at 30° C for 3 days. Table II shows that the levels of clupeine sulphate that inhibited growth of the bacteria were reduced as the pH value was raised.

EXPERIMENT 3

This Experiment illustrates the alkali potentiation of a sequestrant when its anti-bacterial activity was tested against typical food spoilage bacterial otherwise cultured under ideal conditions.

The aerobic bacteria were grown in heart infusion broth and the anaerobic (*Clostridium sporogenes*) in reinforced clostridial medium. Incubation time was 6 days at 30° C. Sodium hexametaphosphate levels tested were 0, 0.005, 0.1, 0.5, 1.0, 2.5, 5.0 and 10 percent w/v.

Table III illustrates the increased inhibitory effect of polyphosphate at high pH values.

TABLE III

| Bacteria | Minimum Inhibitory Concentration of Sodium hexametaphosphate (%) at pH values of | | | | | | | | |
|---|---|---|---|---|---|---|---|---|---|
| | 7 | 7.5 | 8 | 8.5 | 9 | 9.5 | 10 | 10.5 | 11 |
| Bacillus cereus | 0.1 | 0.1 | 0.5 | 0.5 | 0.1 | 0.05 | 0.05 | 0 | 0 |
| Clostridium sporogenes | 1.0 | 1.0 | 2.5 | 0.5 | 0.1 | 0.01 | 0 | 0 | 0 |
| Pseudomonas fluorescens | 10 | 10 | 5 | 2.5 | 1.0 | 0.005 | 0 | 0 | 0 |
| Escherichia coli | >10 | >10 | >10 | >10 | 5.0 | 0.1 | 0 | 0 | 0 |
| Proteus species | >10 | >10 | >10 | >10 | 10 | 0.5 | 0 | 0 | 0 |
| Leuconostoc species | >10 | >10 | >10 | >10 | >10 | >10 | 0.5 | 0.1 | 0.5 |
| Streptococcus faecalis | >10 | >10 | >10 | >10 | >10 | >10 | 10 | >10 | 5.0 |

EXPERIMENT 4

This Experiment illustrates the fact that alkali is a

TABLE II

| Bacteria | Inhibitory Concentrations of Clupeine Sulphate (ppm) at pH values of | | | | | | | | |
|---|---|---|---|---|---|---|---|---|---|
| | 7 | 7.5 | 8 | 8.5 | 9 | 9.5 | 10 | 10.5 | 11 |
| Leuconostoc species | 100 | 50 | 5 | 2.5 | 0 | 0 | 0 | 0 | 0 |
| Pseudomonas fluorescens | 50 | 50 | 50 | 10 | 2.5 | 1 | 0 | 0 | 0 |
| Proteus species | >600 | >600 | 600 | 100 | 50 | 0 | 0 | 0 | 0 |
| Escherichia coli | >100 | >100 | 100 | 100 | 50 | 50 | 1 | 0 | 0 |
| Bacillus cereus | 100 | 100 | 50 | 10 | 5 | 5 | 1 | 0 | 0 |
| Micrococcus lysodeikticus | 5 | 5 | 5 | 5 | 5 | 5 | 0.5 | 0 | 0 |
| Streptococcus faecalis | >600 | >600 | >600 | 500 | 200 | 100 | 50 | 0 | 0 |
| Clostridium sporogenes | >600 | >600 | 300 | 200 | 0 | 0 | 0 | 0 | 0 | more effective inhibitor of microbial growth in the absence than in the presence of oxygen.

Samples of heart infusion broth were adjusted to pH values of 7.2, 8.5, 9.0, 9.5 and 10.0 with sodium hydroxide, and inoculated with the bacteria *Escherichia coli* or *Bacillus cereus* at $10^3$ or $10^7$ organisms per ml. After 8 days incubation at 30° C, the pattern of growth was as shown in Table IV.

TABLE IV

| Incubation conditions | pH Value | E. coli Inoculum Level | | B. cereus Inoculum Level | |
|---|---|---|---|---|---|
| | | $10^3$ | $10^7$ | $10^3$ | $10^7$ |
| Oxygen Present | 7.2 | +++ | +++ | +++ | +++ |
| | 8.5 | +++ | +++ | +++ | +++ |
| | 9.0 | +++ | +++ | +++ | +++ |
| | 9.5 | – | ++ | – | ++ |
| | 10.0 | – | – | – | + |
| Oxygen Absent | 7.2 | +++ | +++ | +++ | +++ |
| | 8.5 | +++ | +++ | +++ | +++ |
| | 9.0 | +++ | +++ | ++ | ++ |
| | 9.5 | – | – | – | – |
| | 10.0 | – | – | – | – |

The increased effectiveness of alkali in the absence of oxygen was most clearly seen at pH 9.5, where the heavy inocula of both *E. coli* and *B. cereus* grew in the presence, but not in the absence of oxygen.

The invention is further illustrated by the following Examples which describe its application to the preservation of foodstuffs.

EXAMPLE 1

This Example illustrates alkali preservation of comminuted meat containing natural contaminant bacterial flora.

Comminuted raw meat samples (10 g) were left at their natural pH value of about pH 6.0 or were adjusted to pH 9.0 and 10.0 with sodium carbonate. Citric acid bound within granules of fat (palm top stearin fraction) was added to some samples in sufficient quantity to neutralise the alkalinity when the acid was released from the melting fat during cooking. In addition, a sequestrant polyphosphate (Tariphos) was added to some samples at levels of 0.34 percent by weight. The samples were incubated at 10° C for up to 9 days, and the pH values and numbers of bacteria were estimated daily.

The pH value of the pH 6 samples remained aout constant during the 9 day period; the samples initially at pH 9 had fallen to pH 8 in about 5 days, and the samples initially at pH 10 had fallen to about pH 9 in 5 days.

Table IV shows the number of bacteria in the various samples each day, and the preservative effect of the alkalinisation. Polyphosphates caused a general decrease in bacterial numbers in the pH 10 samples. The samples were cooked by frying after 9 days, which resulted in neutralisation so that the pH value of the preserved samples containing bound citric acid fell to the normal meat pH value of about 6.

EXAMPLE 2

This Example illustrates the alkali preservation of a composite Beef Risotto dish.

A dried Beef Risotto meal was reconstituted with water and adjusted to various alkaline pH values with sodium hydroxide. Aliquots were then packed in plastic pouches and pasteurised at 75° C for 45 minutes, prior to storage at 20° C.

Table V shows the resulting growth of bacteria, indicating that in a pasteurised food with no additives, pH values of between 10.1 and 10.5 were necessary to prevent microbial growth over a period of 60 days.

Table V

| Days at 20°C | Nos of bacteria / g. of sample at pH | | | |
|---|---|---|---|---|
| | 5.2 (control) | 9.7 | 10.1 | 10.5 |
| 0 | <100 | <100 | <100 | <100 |
| 2 | <100 | <100 | <100 | <100 |
| 5 | 9×10⁸ | 2×10³ | <100 | <100 |
| 9 | – | 1.2×10⁴ | <100 | <100 |
| 16 | – | – | <100 | <100 |
| 19 | – | – | <100 | <100 |
| 26 | – | – | <100 | <100 |
| 60 | – | – | 7.2×10⁷ | <100 |

EXAMPLE 3

This Example illustrates the alkali preservation of several food products.

Various foods were alkalinized by adding sodium carbonate. Then capsules containing citric acid were added in quantities calculated to be sufficient to return the pH values after cooking to the original pH of the foods.

The alkalinized foods containing capsules were incubated at 10° C: the growth of bacteria, which was recorded daily, is shown in Table VI, which indicates that a storage pH value of less than 10.0 did not prevent spoilage whereas the samples stored at pH 10.0 did not spoil.

TABLE IV

| Initial pH value of sample | Polyphosphate present or absent | Bound citric acid present or absent | Numbers of bacterial present (per gm) after storage at 10°C for (days) | | | | |
|---|---|---|---|---|---|---|---|
| | | | 0 | 2 | 4 | 6 | 9 |
| 6 | absent | absent | $3.1 \times 10^4$ | $3.9 \times 10^6$ | $4.6 \times 10^8$ | $2.2 \times 10^9$ | $3.8 \times 10^8$ |
| 6 | present | absent | $2.4 \times 10^4$ | $6.0 \times 10^5$ | $1.2 \times 10^9$ | $1.3 \times 10^9$ | $4.1 \times 10^8$ |
| 9 | absent | absent | $1.2 \times 10^4$ | $7.6 \times 10^3$ | $4.1 \times 10^5$ | $1.9 \times 10^8$ | $2.7 \times 10^8$ |
| 9 | absent | present | $2.4 \times 10^4$ | $1.4 \times 10^5$ | $2.5 \times 10^6$ | $4.0 \times 10^8$ | $2.3 \times 10^8$ |
| 9 | present | absent | $1.1 \times 10^4$ | $8.5 \times 10^3$ | $1.4 \times 10^6$ | $1.1 \times 10^8$ | $2.8 \times 10^8$ |
| 9 | present | present | $1.4 \times 10^4$ | $3.6 \times 10^6$ | $2.6 \times 10^7$ | $8.5 \times$ ⁸ | $4.0 \times 10^8$ |
| 10 | absent | absent | $9.1 \times 10^3$ | $2.2 \times 10^3$ | $3.2 \times 10^3$ | $5.3 \times 10^3$ | $2.1 \times 10^3$ |
| 10 | absent | present | $5.7 \times 10^3$ | $1.4 \times 10^3$ | $1.2 \times 10^3$ | $3.2 \times 10^4$ | $4.1 \times 10^4$ |
| 10 | present | absent | $8.4 \times 10^3$ | $1.0 \times 10^3$ | $2.7 \times 10^2$ | $7.5 \times 10^1$ | $1.0 \times 10^2$ |
| 10 | present | present | $4.8 \times 10^3$ | $2.1 \times 10^4$ | $1.3 \times 10^3$ | $8.0 \times 10^3$ | $2.0 \times 10^3$ |

TABLE VI

| Product | pH Value | Capsules added(%) | Nos of bacteria (per g.) after inoculation for (days):- | | | | | |
|---|---|---|---|---|---|---|---|---|
| | | | 0 | 1 | 2 | 3 | 4 | |
| Comminuted Meat | 6.0 | 0(control) | $3.1 \times 10^4$ | $2.3 \times 6^5$ | $3.9 \times 10^6$ | $2.6 \times 10^8$ | $4.6 \times 10^8$ | |
| | 5.5 | $2.4 \times 10^4$ | $2.1 \times 10^4$ | $1.4 \times 10^5$ | $6.4 \times 10^6$ | $2.5 \times 10^8$ | | |
| | 9.0 | | | | | | | |
| | 10.0 | 7.5 | $5.3 \times 10^4$ | $8.9 \times 10^3$ | $1.4 \times 10^3$ | $1.3 \times 10^3$ | $1.2 \times 10^3$ | |
| Chicken Supreme | 6.2 | 0(control) | $1.7 \times 10^3$ | $2.1 \times 10^4$ | $1.0 \times 10^3$ | $5.2 \times 10^4$ | $1.3 \times 10^7$ | |
| | 10.0 | 3.0 | $2.4 \times 10^2$ | $8.2 \times 10^2$ | $2.1 \times 10^3$ | $1.9 \times 10^4$ | $2.4 \times 10^4$ | |
| Sausage Meat | 5.9 | 0(control) | $1.5 \times 10^7$ | $3.0 \times 10^7$ | $1.1 \times 10^9$ | $1.8 \times 10^9$ | — | |
| | 9.0 | 3.1 | $4.2 \times 10^6$ | $2.2 \times 10^7$ | $3.0 \times 10^7$ | $1.2 \times 10^7$ | $8.0 \times 10^6$ | |
| | 10.0 | 5.0 | $4.1 \times 10^5$ | $2.5 \times 10^5$ | $1.5 \times 10^5$ | $9.2 \times 10^4$ | $8.9 \times 10^4$ | |
| | | | 5 | 6 | 7 | 8 | 9 | 11 |
| Comminuted Meat | 6.0 | 0(control) | — | — | — | — | — | — |
| | 5.5 | $1.8 \times 10^8$ | $4.0 \times 10^8$ | $2.0 \times 10^8$ | $1.0 \times 10^8$ | $2.3 \times 10^8$ | — | |
| | 9.0 | | | | | | | |
| | 10.0 | 7.5 | $5.5 \times 10^4$ | $3.2 \times 10^4$ | $5.8 \times 10^3$ | $2.7 \times 10^4$ | $4.1 \times 10^4$ | — |
| Chicken Supreme | 6.2 | 0(control) | $2.7 \times 10^7$ | $3.0 \times 10^7$ | $1.2 \times 10^8$ | $1.8 \times 10^8$ | — | — |
| | 10.0 | 3.0 | $1.9 \times 10^4$ | $4.0 \times 10^4$ | $1.4 \times 10^4$ | $5.6 \times 10^4$ | $1.4 \times 10^4$ | $2.4 \times 10^4$ |
| Sausage Meat | 5.9 | 0(control) | — | — | — | — | — | — |
| | 9.0 | 3.1 | $1.2 \times 10^7$ | $6.1 \times 10^6$ | $7.9 \times 10^6$ | $7.9 \times 10^6$ | $4.0 \times 10^7$ | — |
| | 10.0 | 5.0 | $2.0 \times 10^5$ | $1.4 \times 10^5$ | $5.0 \times 10^4$ | $7.6 \times 10^4$ | $7.6 \times 10^4$ | — |

I claim:

1. A package containing in admixture a moist finely divided, comminuted or liquid foodstuff which must be heated prior to consumption and which would normally be subject to microbial spoilage during storage, an edible alkali to give said foodstuff a pH of at least 10 to effect preservation during storage, and an edible alkali-neutralising substance encapsulated in edible gelatin whereby said edible alkali-neutralizing substance during storage at an ambient temperature is kept separate in a heat-releasable manner from said foodstuff but which is released to neutralise said alkali when the contents of said package are heated prior to consumption.

2. A package according to claim 1, wherein the separation is achieved by having said alkali-neutralising substance physically bound within particles of an edible fat which melts at about 60° C.

3. A package according to claim 1, wherein said foodstuff includes raw meat.

* * * * *